Figure 1:
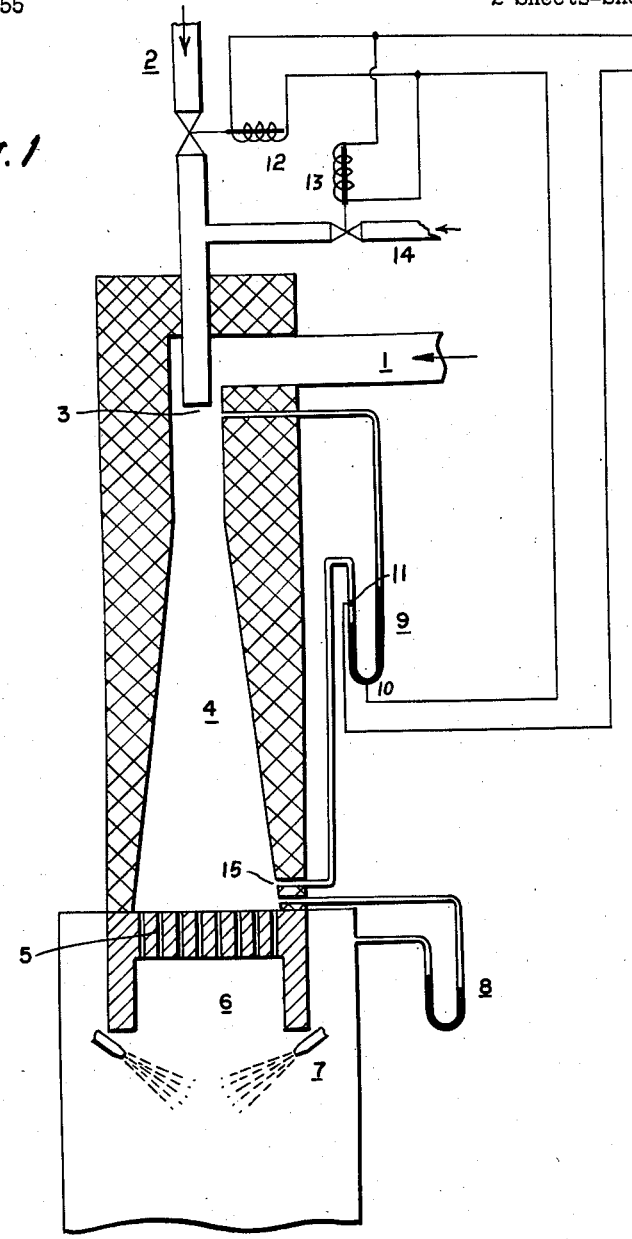

June 10, 1958  E. LEHRER  2,838,585
PRODUCTION OF ACETYLENE BY INCOMPLETE COMBUSTION
OF HYDROCARBONS WITH OXYGEN, AND
APPARATUS THEREFOR Filed Jan. 13, 1955  2 Sheets-Sheet 1

INVENTOR:
ERWIN LEHRER
BY
Mazyall, Johnston, Cook
& Root
ATT'YS

*INVENTOR:*
ERWIN LEHRER

ATT'YS

United States Patent Office 2,838,585
Patented June 10, 1958

2,838,585

PRODUCTION OF ACETYLENE BY INCOMPLETE COMBUSTION OF HYDROCARBONS WITH OXYGEN, AND APPARATUS THEREFOR

Erwin Lehrer, Bad Duerkheim, Germany, assignor to Badische Anilin- & Soda-Fabrik Aktiengesellschaft, Ludwigshafen (Rhine), Germany Application January 13, 1955, Serial No. 481,667

Claims priority, application Germany January 20, 1954

9 Claims. (Cl. 260—679)

This invention relates to the production of acetylene by incomplete combustion of hydrocarbons.

Processes for the production of acetylene by incomplete combustion of gaseous or vaporous hydrocarbons with oxygen or oxygen-rich gas mixtures are known in which the hydrocarbons and the oxygen are separately preheated, then mixed and then, after the most complete mixing possible, are subjected to a flame reaction. The reaction gases are then cooled as rapidly as possible, usually by spraying with water. An elongated, rotation-symmetrical arrangement such as is described in U. S. patent specification No. 2,664,450 is especially suitable as a mixing apparatus. The hydrocarbon and the oxygen enter this apparatus at high speed. The speed of flow of the mixture is reduced by conical widening of the mixing chamber and the thorough mixing is thereby completed. The prepared mixture leaves the mixing chamber at its wide end through a number of parallel channels with which the reaction chamber for the flame reaction is connected.

Experience has shown that the mixture of hydrocarbon and oxygen occasionally ignites in the mixing chamber and then the mixing chamber and the adjoining channels are destroyed in a very short time by reason of the high temperature of the flame formed. Safety means are known which seek to avoid the destruction of the endangered parts by providing that upon an ignition in the mixing chamber the stream of oxygen is rapidly shut off by a quick-acting valve and the oxygen pipe is rinsed with nitrogen. In these known devices, the safety measure is initiated by the rise in temperature which occurs in the event of an ignition in the mixing chamber and which is measured by temperature-responsive means at the end of the mixing chamber or by the loss of pressure of the gas stream in the channels which lead from the mixing chamber to the reaction chamber; this pressure drop increases when ignition takes place in the mixing chamber. These methods for initiating the safety measures are, however, not sufficient in practice. The temperature responsive means always has a certain inertia, so that the oxygen is shut off too late. The mixing chamber and the channels are probably not destroyed by the first ignition, but after a few ignitions they become so badly damaged that they must be renewed, and this results in loss of production for several days. The pressure drop of the gas stream in the channels between the mixing chamber and the reaction chamber increases only relatively little when there is an ignition in the mixing chamber. Since this pressure drop is, however, also dependent on the size of the gas throughput, the safety measures are often initiated by increasing the throughput, without any ignition having occurred. On the other hand it may occur, especially after a reduction in the throughput, that the safety measures are not initiated if the initiation contact has not been regulated.

I have now found that a reliable initiation of the safety measures in the event of an ignition in the mixing chamber can be obtained by providing the impulse for the safety device from the pressure difference between the place at which the gases meet and a place farther on in the direction of flow at which a small gas speed prevails. Such a place where the gas speed is small is for example the end of the conically widened part of the mixing chamber. It has been found that in normal operation the pressure at the point of mixing is considerably lower than at the end of the mixing chamber because at the point of mixing the gas speed is very high. If an ignition takes place in the mixing chamber, the pressure at the point of mixing rises considerably above the pressure at the end of the mixing chamber; the pressure difference thus changes its sign and becomes positive (considered in the direction of the gas flow). The initiation contact is preferably regulated in the neighborhood of pressure equality. The safety measures are initiated completely reliably and very rapidly when an ignition takes place in the mixing chamber. Initiation by reason of increase in throughput does not occur because the pressure difference thereby assumes a higher negative value.

The same advantages are obtained when the safety device receives its impulse from the pressure difference between the place at which the gases meet and the reaction chamber or a chamber following the same the pressure of which does not differ appreciably from that of the reaction chamber. Also in this case the pressure difference, considered in the direction of flow, is negative in normal operation and attains a high positive value in the event of an ignition in the mixing chamber. In many cases it is sufficient for the safety device to receive an impulse by the pressure difference between the place at which the gases meet and the surrounding atmosphere. This method is especially suitable when the pressure in the reaction chamber is kept practically constant by special regulating means or by causing the gas mixture produced to flow direct into a gas-holder.

Another possibility is tapping off the pipes for the hydrocarbon or the oxygen to the mixing point in the neighborhood of the latter in such a way that the pressure difference between this tapping and the end of the mixing chamber or the reaction chamber practically disappears in normal operation. This pressure difference is then only slightly dependent on the throughput and is equally suitable for imparting an impulse to the safety plant because it assumes a high positive value upon the occurrence of an ignition in the mixing chamber. In this case, however, the variation in the pressure difference by reason of an ignition is not so great as in the cases described above.

In the drawings, wherein similar reference figures are employed to designate similar parts in all of the figures, Fig. 1 is a diagrammatic and cross-sectional view of apparatus suitable for carrying out the present process, particularly illustrating one embodiment of the points between which a pressure difference is measured; and Figs. 2, 3, 4 and 5 illustrate additional embodiments of the invention, differing only in the points between which a pressure difference is measured.

In Fig. 1, a preheated gaseous hydrocarbon enters a mixing chamber 4 through a pipe 1 where it meets a stream of preheated oxygen-containing gas introduced through pipe 2 at a point 3 in the inlet zone of the mixing chamber. The mixing chamber widens conically from its inlet zone to an outlet into a reaction chamber 6. The gaseous mixture in the mixing chamber 4 passes through parallel channels 5 into the reaction chamber 6 wherein a flame reaction takes place between the gaseous hydrocarbon and the oxygen-containing gas to produce acetylene. The hot reaction gases are cooled by a water spray from a plurality of water jets 7. A manometer 8 indicates the pressure difference between the mixing chamber 4 and the reaction chamber 6. A manometer 9 measures the pressure difference between a point 3 at which the entering gases meet and a point 15 near the outlet of the conically widened mixing chamber. An electric contact 11 is situated in the manometer 9 so as to close an electrical circuit by contact with the mercury in the manometer at approximately pressure equality. Another electrical contact 10 is situated at the base of the manometer 9 to maintain contact with the mercury in the manometer. The electric contacts 11 and 10 are connected in parallel circuit to a solenoid valve 12 in the oxygen line 2 and a solenoid valve 13 in line 14 which leads into the oxygen line 2 and is adapted to supply an inert gas such as nitrogen. A premature ignition in the mixing chamber 4 induces a pressure increase in the vicinity of the inlet zone such as at point 3. This increase in pressure causes the electrical contact 11 to be closed, operating solenoid valve 12 to shut off the supply of oxygen to the mixing chamber 4 and to open the valve 13 to rinse the mixing chamber with an inert gas. During normal operation the valve 12 is open while the valve 13 is closed.

Figure 2:
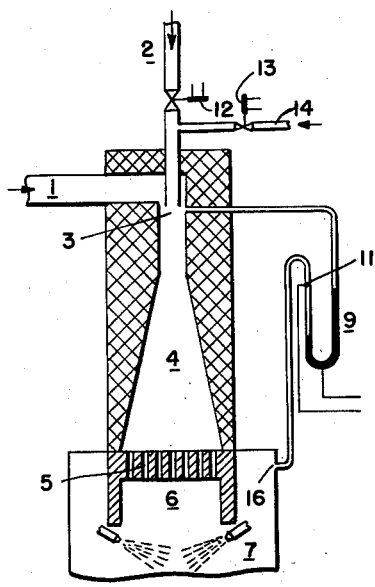
Figure 3:
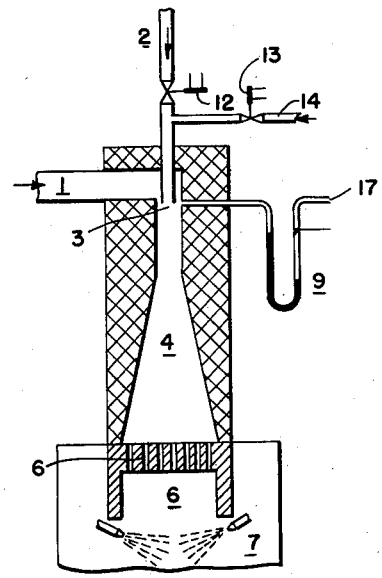
Figure 4:
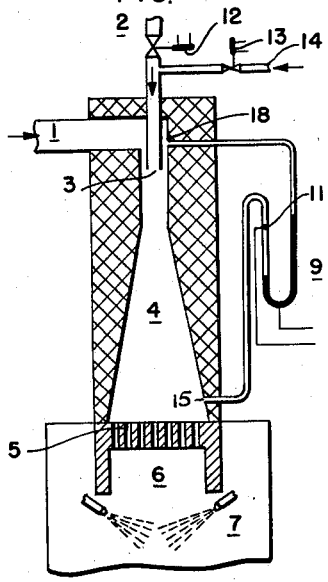
Figure 5:
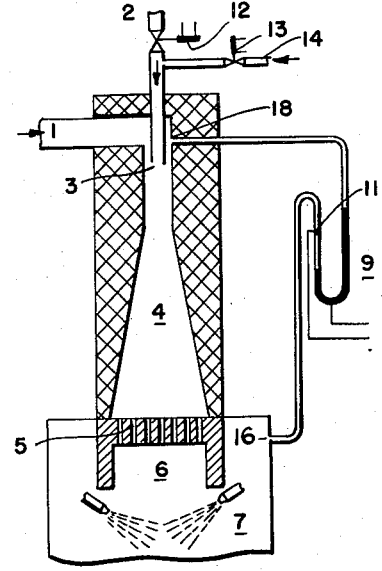

Fig. 2 illustrates an embodiment in which the pressure difference is measured between point 3 where the gases meet in the inlet zone and a point 16 in the reaction chamber. Fig. 3 shows a pressure difference measured between the point where the gases meet in the inlet zone and the surrounding atmosphere 17. Fig. 4 illustrates another embodiment in which the pressure difference is measured between a point 18 immediately before that point 3 at which the gases meet in the inlet zone and a point 15 near the outlet of the mixing chamber. Fig. 5 shows the pressure difference measured between point 18 and a point 16 in the reaction chamber. Generally, the present invention is concerned primarily with monitoring the pressure in the vicinity of the inlet zone, and additional points with which this pressure can be compared to actuate an electrical contact will be readily suggested to those familiar with the art.

The following example will further illustrate this invention but the invention is not restricted to this example. The example is given with reference to Fig. 1 of the accompanying drawings in which is shown diagrammatically apparatus suitable for carrying out the invention.

*Example*

1800 cubic meters per hour of methane are heated to a temperature of 600° C. in a preheater (not shown) and 1050 cubic meters per hour of oxygen are similarly heated to a temperature of 600° C. in a second preheater (not shown). The hot gases are supplied to a mixing device according to the said U. S. patent specification No. 2,664,450 and as shown in the drawing. The methane enters through a pipe 1 and the oxygen through a pipe 2. The gases meet at the point 3 and are mixed in the mixing chamber 4. The mixture passes through parallel channels 5 into the reaction chamber 6 where the oxygen reacts with the methane with the formation of a flame. The reaction gases are cooled by spraying in water by means of jets 7. 3400 cubic meters per hour of a gas mixture are formed which contains about 8.5% of acetylene.

The loss in pressure of the mixture in the channels 5, which is measured by the differential pressure meter 8, amounts to about 17 mm. of Hg. The pressure difference between the point 3 at which the methane and oxygen meet and a point 15 near the end of the mixing chamber 4 is measured by a differential pressure meter 9; it amounts to about −110 mm. of Hg. If the gas mixture ignites within the mixing chamber 4, the loss of pressure in the channels 5 between the mixing chamber 4 and the reaction chamber 6 rises to about 25–28 mm. of Hg., i. e. by only 8 to 11 mm. of Hg. This is insufficient for a reliable initiation of the safety measures (shutting off of the stream of oxygen and rinsing with nitrogen). The pressure difference between the mixing point 3 and a point 15 near the end of the mixing chamber 4, on the other hand, rises to about +120 mm. of Hg and thus varies by about 230 mm. of Hg. By this great change in the pressure difference, the safety measures are absolutely reliable initiated, namely a valve in the oxygen supply pipe to the preheater is closed by means of electrical actuation.

I claim:

1. In a process for the production of acetylene by incomplete combustion of a gaseous hydrocarbon with an oxygen-containing gas wherein a gaseous hydrocarbon and an oxygen-containing gas are separately preheated and separately introduced into an inlet zone of a mixing chamber to form a gaseous mixture therein, said mixing chamber widening conically from its inlet zone to an outlet into a reaction chamber in which the gases react in a flame reaction, the method for counteracting premature ignition of the gaseous mixture in said mixing chamber which comprises monitoring the pressure in the vicinity of said inlet zone for an increase in pressure induced by said premature ignition, and altering the composition of said gaseous mixture to render said mixture incombustible in response to said increase in pressure.

2. In a process for the production of acetylene by incomplete combustion of a gaseous hydrocarbon with an oxygen-containing gas wherein a gaseous hydrocarbon and an oxygen-containing gas are separately preheated and separately introduced into an inlet zone of a mixing chamber to form a gaseous mixture therein, said mixing chamber widening conically from its inlet zone to an outlet into a reaction chamber in which the gases react in a flame reaction, the method for counteracting premature ignition of the gaseous mixture in said mixing chamber which comprises monitoring the pressure in the vicinity of said inlet zone for an increase in pressure induced by said premature ignition, and shutting off the supply of oxygen-containing gas to said mixing chamber to render said gaseous mixture incombustible and rinsing said mixing chamber with nitrogen in response to said increase in pressure.

3. A process as defined in claim 1 wherein the pressure is monitored in the vicinity of the inlet zone by measuring the pressure difference between the point where the gases meet in the inlet zone and a point near the outlet of the conically widened chamber.

4. A process as defined in claim 1 wherein the pressure is monitored in the vicinity of the inlet zone by measuring the pressure difference between the point where the gases meet in the inlet zone and a point in the reaction chamber.

5. A process as defined in claim 1 wherein the pressure is monitored in the vicinity of the inlet zone by measuring the pressure difference between the point where the gases meet in the inlet zone and the surrounding atmosphere.

6. A process as defined in claim 1 wherein the pressure is monitored in the vicinity of the inlet zone by measuring the pressure difference between a point immediately before that point at which the gases meet in the inlet zone and a point near the outlet of the conically widened mixing chamber.

7. A process as defined in claim 1 wherein the pressure is monitored in the vicinity of the inlet zone by measuring the pressure difference between a point immediately before that point at which the gases meet in the inlet zone and a point in the reaction chamber.

8. In combination with apparatus for the production of acetylene by incomplete combustion of a gaseous hydrocarbon with an oxygen-containing gas wherein preheated gaseous hydrocarbon and preheated oxygen-containing gas are mixed and then reacted in a flame reaction, said apparatus including a mixing chamber connected to a reaction chamber, and means for separately introducing said preheated gases into an inlet zone of said mixing chamber, said mixing chamber widening conically from its said inlet zone to its outlet to said reaction chamber, means for counteracting premature ignition in said mixing chamber which comprise a pressure-sensitive device in gaseous communication in the vicinity of said inlet zone with at least one of said gases, and means responsive to said pressure-sensitive device for quenching a flame in said mixing chamber.

9. In combination with apparatus for the production of acetylene by incomplete combustion of a gaseous hydrocarbon with an oxygen-containing gas wherein preheated gaseous hydrocarbon and preheated oxygen-containing gas are mixed and then reacted in a flame reaction, said apparatus including a mixing chamber connected to a reaction chamber, and means for separately introducing said preheated gases into an inlet zone of said mixing chamber, said mixing chamber widening conically from its said inlet zone to its outlet to said reaction chamber, means for counteracting premature ignition in said mixing chamber which comprises a pressure-sensitive device in gaseous communication in the vicinity of said inlet zone with at least one of said gases, means responsive to said pressure-sensitive device for shutting off the oxygen-containing gas to said mixing chamber, and means responsive to said pressure-sensitive device for rinsing said mixing chamber with an inert gas.

References Cited in the file of this patent

UNITED STATES PATENTS

| | | |
|---|---|---|
| 1,923,614 | Clarkson | Aug. 22, 1933 |
| 2,445,466 | Arnhym | July 20, 1948 |
| 2,630,461 | Sachsse et al. | Mar. 3, 1953 |
| 2,698,350 | Dutcher | Dec. 28, 1954 |

OTHER REFERENCES

Fiat Final Report 720, Office of Military Government for Germany, (U. S.) Field Information Agency Technical, Jan. 28, 1946, pages 12 and 25.